(12) United States Patent
Wirkus et al.

(10) Patent No.: US 11,208,165 B2
(45) Date of Patent: Dec. 28, 2021

(54) PASSIVE TRACK TENSIONING SYSTEM

(71) Applicant: Joy Global Surface Mining Inc, Milwaukee, WI (US)

(72) Inventors: Joseph James Wirkus, West Bend, WI (US); James Michael Hutsick, Mount Pleasant, WI (US)

(73) Assignee: Joy Global Surface Mining Inc, Milwaukee, WI (US)

( * ) Notice: Subject to any disclaimer, the term of this patent is extended or adjusted under 35 U.S.C. 154(b) by 385 days.

(21) Appl. No.: 16/052,188

(22) Filed: Aug. 1, 2018

(65) Prior Publication Data

US 2019/0039666 A1    Feb. 7, 2019

Related U.S. Application Data

(60) Provisional application No. 62/540,191, filed on Aug. 2, 2017.

(51) Int. Cl.
    *B62D 55/30*    (2006.01)

(52) U.S. Cl.
    CPC .................. *B62D 55/30* (2013.01)

(58) Field of Classification Search
    CPC ...... B62D 55/30; B62D 55/305; B62D 55/32; F16H 7/08
    See application file for complete search history.

(56) References Cited

U.S. PATENT DOCUMENTS

| | | | |
|---|---|---|---|
| 3,779,615 A | 12/1973 | Kennicutt et al. | |
| 4,681,376 A | 7/1987 | Riml | |
| 5,254,047 A | 10/1993 | Anderson | |
| 5,368,375 A * | 11/1994 | Gustafson | B62D 55/305 305/143 |
| 5,851,058 A * | 12/1998 | Humbek | B62D 55/30 305/146 |
| 7,172,257 B2 | 2/2007 | Tamaru et al. | |
| 7,520,575 B2 | 4/2009 | Johnson | |
| 8,079,650 B2 | 12/2011 | Tokach et al. | |
| 8,104,846 B2 | 1/2012 | Porubcansky et al. | |
| 8,336,209 B2 | 12/2012 | Sprainis et al. | |
| 8,523,298 B2 | 9/2013 | Braun | |
| 9,457,853 B2 | 10/2016 | Anderfaas et al. | |
| 9,688,516 B2 | 6/2017 | Billiot et al. | |

(Continued)

FOREIGN PATENT DOCUMENTS

| | | |
|---|---|---|
| CN | 102523740 A | 6/2012 |
| JP | 57058567 A * | 4/1982 |

(Continued)

OTHER PUBLICATIONS

Chilean Patent Office Examination Report and Search Report for related Application No. 201802080 dated Aug. 27, 2019 (19 pages including statement of relevance).

*Primary Examiner* — Kip T Kotter
(74) *Attorney, Agent, or Firm* — Michael Best & Friedrich LLP

(57) ABSTRACT

A tensioning system includes an idler wheel, a yoke coupled to the idler wheel, a set of crawler drive tracks that extends around at least a portion of the idler wheel, a mobile base supported by the crawler driver tracks that defines a frame, a pre-load actuating element attached to the mobile base, and a spring element pre-loaded by the pre-load actuating element.

19 Claims, 3 Drawing Sheets

(56) References Cited

U.S. PATENT DOCUMENTS

| | | | | |
|---|---|---|---|---|
| 2012/0217071 | A1* | 8/2012 | Fukumoto | B62D 55/02 180/9.34 |
| 2014/0263142 | A1 | 9/2014 | Billiot et al. | |
| 2016/0368550 | A1* | 12/2016 | Pizon | B62D 55/30 |
| 2018/0037281 | A1* | 2/2018 | Maier | B62D 55/305 |

FOREIGN PATENT DOCUMENTS

| | | | | |
|---|---|---|---|---|
| JP | 2006088766 A | | 4/2006 | |
| KR | 2019990006344 U | | 6/2003 | |
| KR | 100729480 B1 | * | 6/2007 | |
| WO | WO-2005073001 A1 | * | 8/2005 | B60G 17/0424 |
| WO | 2008035931 A1 | | 3/2008 | |

* cited by examiner

PASSIVE TRACK TENSIONING SYSTEM

CROSS-REFERENCE TO RELATED APPLICATIONS

This application claims priority to U.S. Provisional Patent Application No. 62/540,191, filed on Aug. 2, 2017, the entire contents of which are hereby incorporated by reference in their entirety.

BACKGROUND

The present invention relates to crawler tracks and to systems for tensioning crawler tracks. Crawler tracks often become loose and sag over the course of their lifetime. Tensioning systems help to reduce the looseness and sagging.

SUMMARY

In accordance with one construction, a tensioning system includes an idler wheel, a yoke coupled to the idler wheel, a set of crawler drive tracks that extend around at least a portion of the idler wheel, a mobile base supported by the crawler driver tracks that includes a frame, a pre-load actuating element coupled to the frame, and a multi-layered spring element that is pre-loaded by the pre-load actuating element and presses against the yoke to tension the crawler drive tracks.

In accordance with another construction, a tensioning system for a crawler track includes an idler wheel, a mobile base that includes a frame, a pre-load actuating element coupled to the frame, and a spring element that is pre-loaded by the pre-load actuating element. The spring element has a first anchoring plate and a second anchoring plate. A stop element is coupled to and extends from the first anchoring plate of the spring element.

In accordance with another construction, a method for tensioning a crawler track that is supported by frame of a mining machine includes stretching and pre-loading the crawler track with a pre-load actuating element, placing one or more shims between a spring element and a wall of the frame, and deactivating the pre-load actuating element.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION OF THE DRAWINGS

Figure 1:
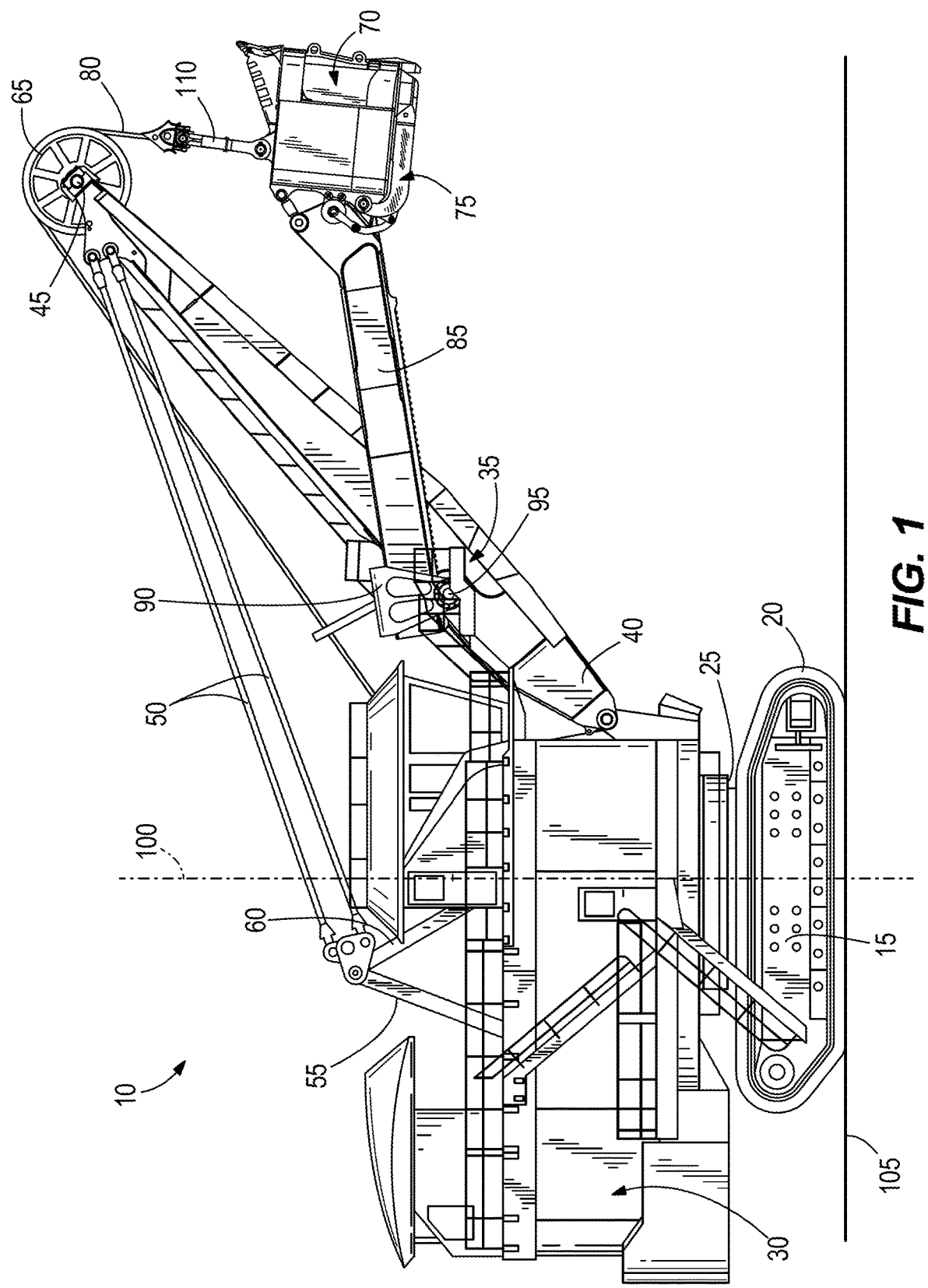
FIG. 1 is a side view of a power mining shovel.

FIG. 1 illustrates a power mining shovel 10. The shovel 10 includes a mobile base 15, crawler drive tracks 20, a turntable 25, a revolving frame 30, a boom 35, a lower end 40 of the boom 35 (also called a boom foot), an upper end 45 of the boom 35 (also called a boom point), tension cables 50, a gantry tension member 55, a gantry compression member 60, a sheave 65 rotatably mounted on the upper end 45 of the boom 35, a dipper 70, a dipper door 75 pivotally coupled to the dipper 70, a hoist rope 80, a winch drum (not shown), a dipper handle 85, a saddle block 90, a shipper shaft 95, and a transmission unit (also called a crowd drive, not shown). The rotational structure 25 allows rotation of the upper frame 30 relative to the lower base 15. The turntable 25 defines a rotational axis 100 of the shovel 10. The rotational axis 100 is perpendicular to a plane 105 defined by the base 15 and generally corresponds to a grade of the ground or support surface.

The mobile base 15 is supported by the crawler drive tracks 20. The mobile base 15 supports the turntable 25 and the revolving frame 30. The turntable 25 is capable of 360-degrees of rotation relative to the mobile base 15. The boom 35 is pivotally connected at the lower end 40 to the revolving frame 30. The boom 35 is held in an upwardly and outwardly extending relation to the revolving frame 30 by the tension cables 50, which are anchored to the gantry tension member 55 and the gantry compression member 60. The gantry compression member 60 is mounted on the revolving frame 30.

The dipper 70 is suspended from the boom 35 by the hoist rope 80. The hoist rope 80 is wrapped over the sheave 65 and attached to the dipper 70 at a bail 110. The hoist rope 80 is anchored to the winch drum (not shown) of the revolving frame 30. The winch drum is driven by at least one electric motor (not shown) that incorporates a transmission unit (not shown). As the winch drum rotates, the hoist rope 80 is paid out to lower the dipper 70 or pulled in to raise the dipper 70. The dipper handle 85 is also coupled to the dipper 70. The dipper handle 85 is slidably supported in the saddle block 90, and the saddle block 90 is pivotally mounted to the boom 35 at the shipper shaft 95. The dipper handle 85 includes a rack and tooth formation thereon that engages a drive pinion (not shown) mounted in the saddle block 90. The drive pinion is driven by an electric motor and transmission unit (not shown) to extend or retract the dipper handle 85 relative to the saddle block 90.

An electrical power source (not shown) is mounted to the revolving frame 30 to provide power to a hoist electric motor (not shown) for driving the hoist drum, one or more crowd electric motors (not shown) for driving the crowd transmission unit, and one or more swing electric motors (not shown) for turning the turntable 25. Each of the crowd, hoist, and swing motors is driven by its own motor controller, or is alternatively driven in response to control signals from a controller (not shown).

Figure 2:
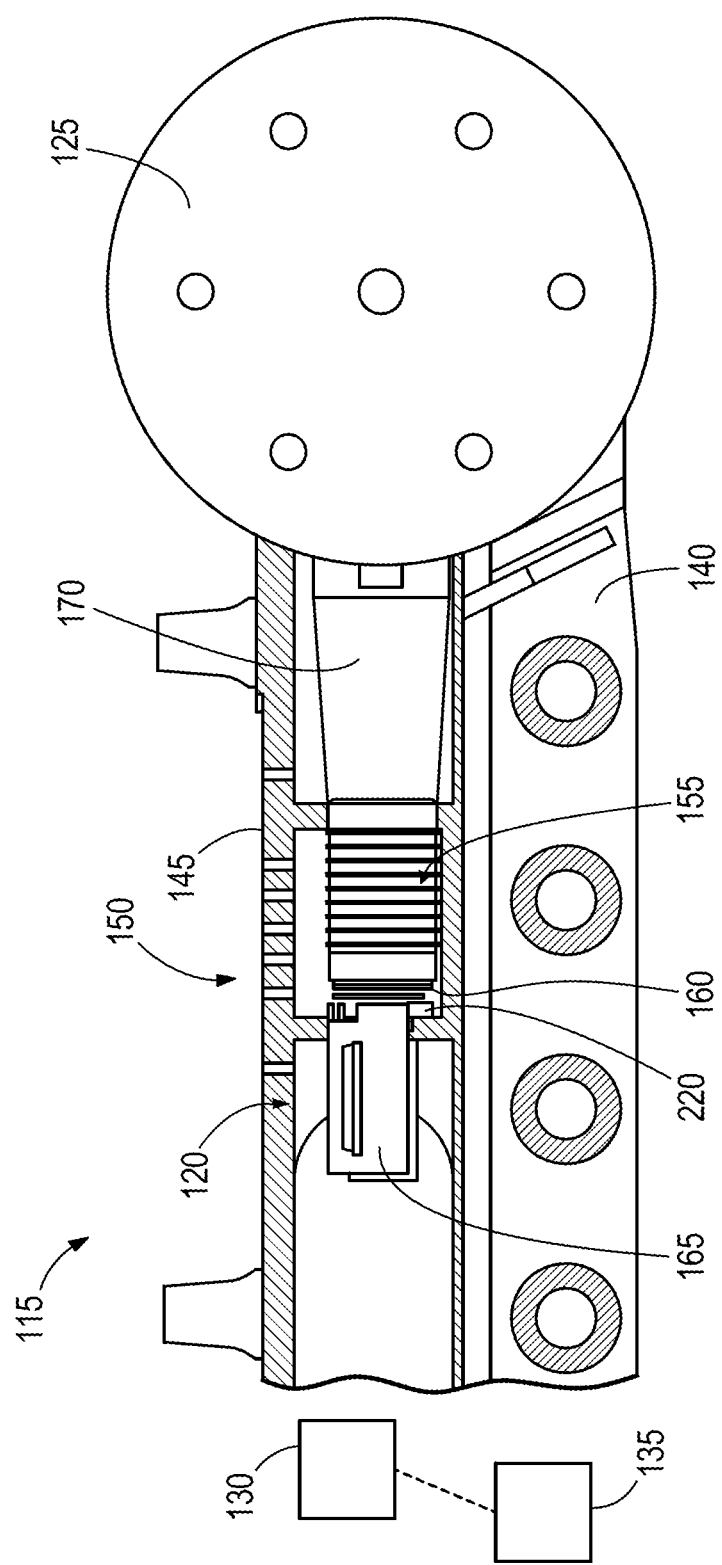
FIG. 2 is a partial side view of a mobile base for the power mining shovel of FIG. 1, illustrating a tensioning system according to one construction.

FIG. 2 illustrates a mobile base 115 that may be used in place of the mobile base 15, or with other machines (e.g., with mining shovels including hybrid and rope type mining shovels, dozers, mining excavators, cranes, etc.). The mobile base 115 includes a frame 120, an idler wheel 125 (e.g., gear), a drive gear 130 (illustrated schematically), and a drive 135 (illustrated schematically) coupled to the drive gear 130. Crawler drive tracks (not illustrated) extend along a bottom 140 of the frame 120, around at least a portion of the idler wheel 125, along a top 145 of the frame, and around at least a portion of the drive gear 130. The drive 135 drives rotation of the drive gear 130, which moves the crawler tracks around the mobile base 115.

Figure 3:
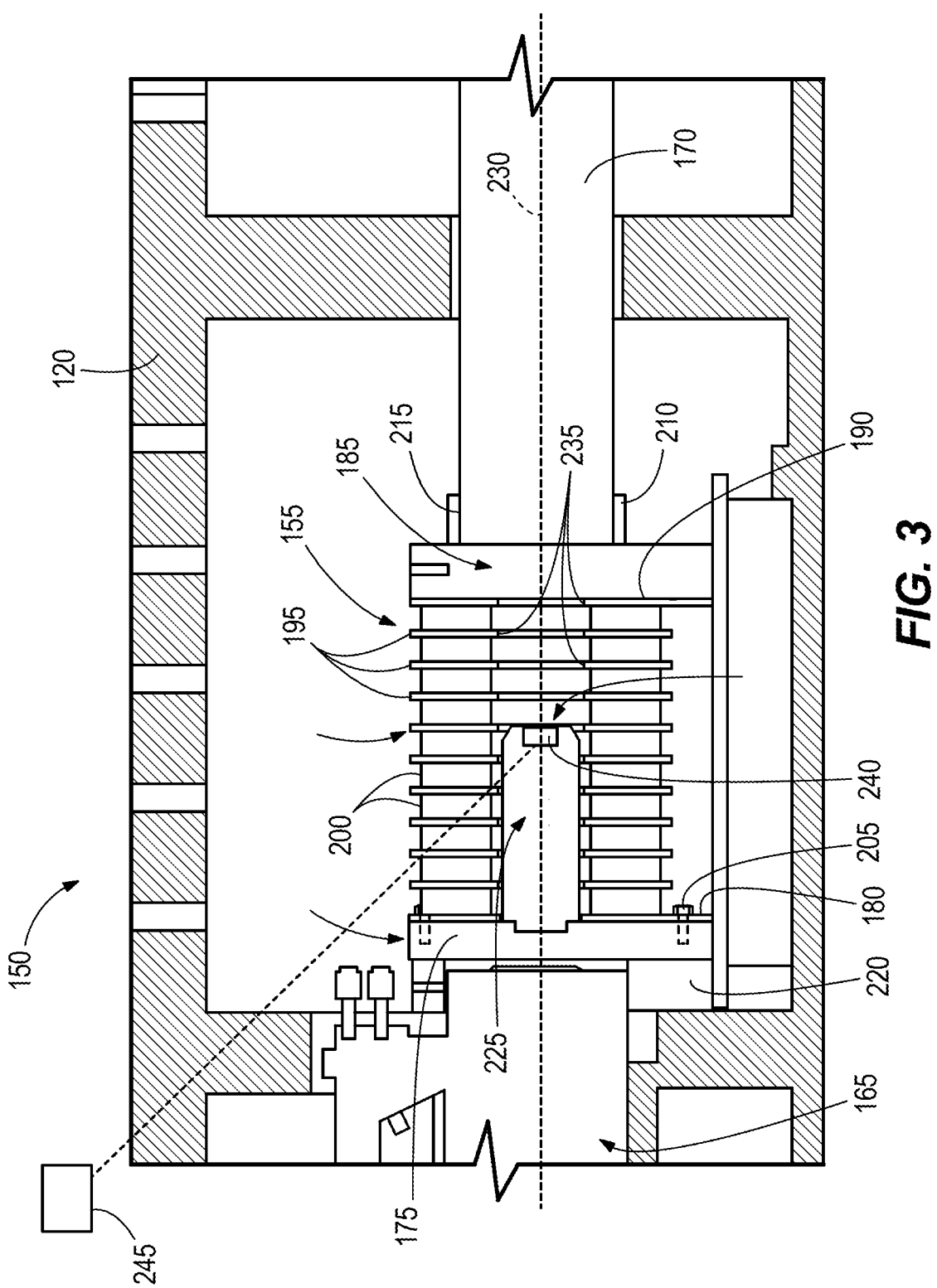
FIG. 3 is an enlarged view of the tensioning system of FIG. 2.

With reference to FIGS. 2 and 3, the mobile base 115 further includes a tensioning system 150 to adjust a position of the idler wheel 125 and to maintain a desired tension in the crawler drive tracks. The tensioning system 150 includes a spring element 155, a shim or shims 160 (FIG. 2), a pre-load actuating element 165, and a yoke 170. The yoke 170 is coupled (e.g., fixed) to the idler wheel 125.

With reference to FIG. 3, in the illustrated construction, the spring element 155 is an elastomeric spring unit having a first anchoring plate 175 and a first end plate 180 coupled to the first anchoring plate 175. The spring element 155 also includes a second anchoring plate 185 and a second end plate 190 coupled to the second anchoring plate 185. The spring element 155 also includes intermediate plates 195 disposed between the first end plate 180 and the second end plate 190, and layers of elastomeric material 200 that are disposed (i.e., sandwiched) between each of the intermediate plates 195 and the first and second end plates 180, 190. In the illustrated construction, the spring element 155 includes ten layers of elastomeric material 200 and nine intermediate plates 195. Other constructions include different numbers of layers of elastomeric material 200 and intermediate plates 195 (e.g., more or less than ten layers of elastomeric material 200 and more or less than nine intermediate plates 195). Additionally, while the layers of elastomeric material 200, the intermediate plates 195, the first anchoring plate 175, the first end plate 180, the second anchoring plate 185, and the second end plate 200 are illustrated generally in FIG. 3 as having particular shapes and/or dimensions, other constructions include various other shapes and dimensions than that illustrated (e.g., more rounded shapes, dimensions, etc.). The dimensions and quantity of the layers of elastomeric material 200 and intermediate plates 195 may be designed to optimize a spring rate (stiffness) and desired deflection for a specific application. For example, the length and width and thickness of each layer of elastomeric material 200 and intermediate plate 195 may be selected, as well as the number of layers of elastomeric material 200 and intermediate plates 195, to achieve a specific spring rate.

With continued reference to FIG. 3, the layers of elastic material 200 are each formed at least partially from an elastomeric material (e.g., a thermoplastic, thermoplastic elastomer, urethane-based material such as polyurethane, and/or a rubber-based material). The intermediate plates 195, the first anchoring plate 175, the first end plate 180, the second anchoring plate 185 and the second end plate 190 are each formed at least partially of metal (e.g., steel). Other constructions include different materials or combinations of materials for the layers of elastic material 200, the intermediate plates 195, the first anchoring plate 175, the first end plate 180, the second anchoring plate 185, and the second end plate 190. In some constructions, the number, size, and shape of the layers of elastic material 200 and the intermediate plates 195, as well as the materials they are each made of, are selected to optimize a spring rate (stiffness) of the spring element 155.

With reference to FIG. 3, in the illustrated construction, the first anchoring plate 175 is coupled to the first end plate 180 via fasteners 205, although in other constructions the first anchoring plate 175 and the first end plate 180 are integrally formed together as a single piece or are coupled with other structures. While not illustrated, in some constructions, the second end plate 190 is also coupled to the second anchoring plate 185 via fasteners, is formed integrally together as a single piece with the second anchoring plate 185, or is coupled to the second anchoring plate 185 with other structures. The layers of elastic material 200 are each coupled to one or more of the intermediate plates 195 via adhesive, fasteners, or via other structures or methods (e.g., molding). Other constructions include various other numbers and arrangements of plates and layers of elastic materials, as well as various other manners by which the plates and layers of elastic materials are coupled together in the spring element 155.

With reference to FIGS. 2 and 3, the pre-load actuating element 165 is coupled to the frame 120 of the mobile base 115. In some constructions, the pre-load actuating element 165 includes at least one portion that is fixed (e.g., with fasteners) to the frame 120. In the illustrated construction, the pre-load actuating element 165 is a hydraulic cylinder having a ram portion (not illustrated) that moves toward the first anchoring plate 175 and presses against the first anchoring plate 175. Other constructions include different types of pre-load actuating elements 165 (e.g., pneumatic cylinders, electric linear actuators, etc.).

With continued reference to FIGS. 2 and 3, during operation the pre-load actuating element 165 is initially used to stretch and pre-load the crawler track. To pre-load the crawler track, the ram portion contacts and presses against the first anchoring plate 175, pushing the spring element to the right as illustrated in FIG. 2. This movement forces the spring element 155 against the yoke 170, which forces the idler wheel 125 to the right, thereby tensioning the crawler track that is wrapped at least partially around the idler wheel 125. As illustrated in FIGS. 2 and 3, the yoke 170 may have a variety of shapes and sizes. For example, the yoke 170 may have a tapered profile as illustrated in FIG. 2, or a non-tapered profile as illustrated in FIG. 3 (e.g., a square cross-sectional beam, etc.). As illustrated in FIG. 3, in some constructions, the second anchoring plate 185 includes a protruding region 210 defining a recess 215 that receives an end of the yoke 170, such that the yoke 170 fits via a releasable frictional engagement against the second anchoring plate 185. Other constructions include different manners of coupling the second anchoring plate 185 to the yoke 170.

With reference to FIG. 2, once the crawler track has been pre-loaded via the pre-load actuating element 165, one or more shims 160 are then placed (e.g., manually) between the spring element 155 and a wall 220 of the frame 120 to maintain a desired tension that has been created in the crawler track. The pre-load actuating element 165 is then deactivated (e.g., the ram portion is retracted). Over time, as the crawler track wears, additional shims 160 are added (e.g., manually) between the spring element 155 and the wall 220, to maintain the desired tension. In some constructions, to add additional shims 160 the pre-load actuating element 165 is activated again, and assists in pressing against the initial set of shims 160 and the spring element 155 to create room for the insertion of the additional shims 160.

With reference to FIG. 3, the tensioning system 150 further includes a stop element 225. The stop element 225 is coupled to and extends from the first anchoring plate 175. During operation, the stop element 225 prevents further compression of the spring element 155 along an axis 230. In the illustrated construction, the stop element 225 extends perpendicularly from the first anchoring plate 175 along the axis 230. In some constructions, the stop element 225 is integrally formed as a single piece with the first anchoring plate 175.

With reference to FIG. 3, each of the intermediate plates 195, the layers of elastic material 200, the first end plate 180, and the second end plate 190 includes an aperture 235 that is sized and shaped to receive at least a portion of the stop element 225. As illustrated in FIG. 3, the stop element 225 extends through the apertures 235 and toward the second anchoring plate 185. While the stop element 225 and apertures 235 are generally rounded in the illustrated embodiment and are located centrally, other embodiments include different shapes, sizes, and/or locations for the stop element 225 and apertures 235. In some constructions, the stop element 225 and/or apertures 235 are not provided.

With reference to FIG. 3, in some constructions, the tensioning system 150 additionally or alternatively includes a switch 240 (illustrated schematically) that indicates if the spring element 155 has been compressed to a particular length along the axis 230 or is approaching reaching a particular length along the axis 230. The switch 240 is a limit switch or other electronic, magnetic, or Hall-effect device. In the illustrated construction, the switch 240 is a limit switch coupled to an end of the stop element 225 and to a controller 245. As the spring element 155 compresses, the second anchoring plate 185 eventually reaches and contacts the switch 240 (or is detected by the switch 240), thereby activating the switch 240 and sending a signal to the controller 245. In other constructions, the switch 240 is coupled elsewhere on the mobile base 115 (e.g., to the frame 120). In some constructions, the controller 245 is coupled to the drive 135, and if the switch 240 is activated, the torque applied by the drive 135 is reduced, and/or a warning (e.g., visual or audio) is issued, so as to reduce a load applied on the spring element 155.

In some constructions, the tensioning system 150 additionally or alternatively includes a sensor or other device that measures a linear position of the yoke 170 in relation to a portion of the frame 120 (or other fixed structure) to determine a distance by which the spring element 155 has been compressed in real time, and to thereby determine whether the torque should be reduced and/or a warning should be issued.

With reference to FIG. 3, in some constructions the first anchoring plate 175 may include at least one lip or other guide structure that extends over a portion of the frame 120 to guide the spring element 155 and force the spring element 155 to move linearly. The second anchoring plate 185 may also include at least one lip or guide structure that extends over a portion of the frame 120 to further guide the spring element 155 and force the spring element 155 to move linearly.

In some constructions, the tensioning systems 150, 350 described herein help to reduce noise and interference at engagement points between a track shoe of the crawler track and a tumbler, idler wheel 125, and/or other component. The tensioning systems 150 may generate reduced friction in engagement points and pin joints, especially when changing direction (e.g., forward to reverse). The tensioning systems 150 may also facilitate decreased pin/lug loading of crawler shoes, and may facilitate less bunching up of track shoes on a bottom of the mobile base 115 or other component. The tensioning systems 150 may also reduce track sagging on a top of the mobile base 115 or other component.

The tensioning systems 150 may provide a low-cost method of passive tensioning, wherein a shim adjustment procedure may be used. The tensioning systems 150, 350 may also facilitate prolonged intervals between shim adjustments.

While the tensioning systems 150 are described above in the context of being used with a power mining shovel with crawler tracks, the tensioning systems 150, 350 may be used in conjunction with other structures including excavators (e.g., hydraulic), hybrid excavators, dozers, and/or smaller equipment.

Although the invention has been described in detail with reference to certain preferred embodiments, variations and modifications exist within the scope and spirit of one or more independent aspects of the invention as described.

What is claimed is:

1. A tensioning system comprising:
   an idler wheel;
   a yoke coupled to the idler wheel;
   a set of crawler drive tracks extending around at least a portion of the idler wheel;
   a mobile base supported by the crawler drive tracks, the mobile base including a frame;
   a pre-load actuating element coupled to the frame;
   a multi-layered spring element configured to be pre-loaded by the pre-load actuating element and configured to press against the yoke to tension the crawler drive tracks; and
   a shim configured to be placed between the spring element and a wall of the frame to maintain a desired tension of the crawler drive track.

2. The tensioning system of claim 1, wherein the spring element includes layers of metal plates and elastic material, the elastic material being at least partially made of an elastomeric material.

3. The tensioning system of claim 1, wherein the spring element includes a first anchoring plate, a second anchoring plate, a first end plate, and a second end plate.

4. The tensioning system of claim 3, wherein the pre-load actuating element includes a ram portion that is configured to move toward the first anchoring plate and press against the first anchoring plate.

5. The tensioning system of claim 3, wherein the first anchoring plate is coupled to the first end plate and the second anchoring plate is coupled to the second end plate.

6. The tensioning system of claim 1, wherein the spring element includes layers of metal plates and elastic material, the elastic material being at least partially made of an elastomeric material, wherein the spring element further includes a first anchoring plate, a second anchoring plate, a first end plate, and a second end plate, and wherein the layers of metal plates and elastic material are disposed between the first end plate and the second end plate.

7. The tensioning system of claim 6, further comprising a stop element that extends through at least one of the metal plates and at least one of the layers of elastomeric material.

8. The tensioning system of claim 7, wherein a switch is coupled to the stop element, the switch configured to detect compression of the spring element.

9. A tensioning system for a crawler track comprising:
   a mobile base including a frame;
   a pre-load actuating element coupled to the frame;
   a spring element configured to be pre-loaded by the pre-load actuating element, the spring element having a first anchoring plate and a second anchoring plate;
   a sensor configured to detect at least one position of the spring element; and
   a stop element coupled to and extending away from the first anchoring plate, wherein the sensor is a limit switch coupled to the stop element, and wherein the tensioning system further includes a controller coupled to the sensor.

10. The tensioning system of claim 9, wherein the spring element includes a first end plate, a second end plate, and layers of intermediate plates and elastic material disposed between the first and second end plates.

11. The tensioning system of claim 10, wherein each of the intermediate plates, the layers of elastic material, the first end plate, and the second end plate includes an aperture configured to receive the stop element.

12. The tensioning system of claim 9, wherein the sensor is configured to detect a distance by which the spring element has been compressed.

13. The tensioning system of claim 9, further comprising a yoke, wherein the sensor is configured to measure a linear position of the yoke in relation to the frame.

14. A method of tensioning a crawler track that is supported by a frame of a mining machine, the method comprising:
   stretching and pre-loading the crawler track with a pre-load actuating element;
   placing at least one shim between a spring element and a wall of the frame;
   and deactivating the pre-load actuating element.

15. The method of claim 14, wherein pre-loading the crawler tracker includes pressing a ram portion of the actuating element against a first anchoring plate coupled to the spring element.

16. The method of claim 15, wherein pressing against the first anchoring plate includes forcing the spring element against a yoke coupled to an idler wheel.

17. The method of claim 16, wherein forcing the spring element against the yoke includes adjusting a position of the idler wheel.

18. The method of claim 14, further comprising activating a limit switch when a stop extending through the spring element contacts a second anchoring plate coupled to the spring element.

19. The method of claim 18, wherein activating the limit switch includes reducing a load applied on the spring element.

* * * * *